United States Patent [19]

Burrows et al.

[11] 4,041,181
[45] Aug. 9, 1977

[54] PET FOOD AND METHOD OF MAKING SAME

[75] Inventors: Ian Edward Burrows, Gaddesby; Peter Arthur Cheney, Mountsorrell; Stephen Arthur Ariss, Melton Mowbray, all of England

[73] Assignee: Pedigree Petfoods Limited, Melton Mowbray, England

[21] Appl. No.: 513,281

[22] Filed: Oct. 9, 1974

[30] Foreign Application Priority Data

Oct. 18, 1973  United Kingdom ............... 48664/73

[51] Int. Cl.² ............................................. A23B 4/12
[52] U.S. Cl. ...................................... 426/55; 426/56; 426/92; 426/805
[58] Field of Search ...................... 426/55, 56, 59, 805, 426/92, 48

[56] References Cited

U.S. PATENT DOCUMENTS

| | | | |
|---|---|---|---|
| 2,986,469 | 5/1961 | Kruss | 426/56 |
| 3,041,174 | 6/1962 | Ehlert | 426/59 |
| 3,516,349 | 6/1970 | Bertullo et al. | 426/48 |
| 3,873,736 | 3/1975 | Palmer et al. | 426/92 |

*Primary Examiner*—Raymond N. Jones
*Assistant Examiner*—C. A. Fan
*Attorney, Agent, or Firm*—Davis, Hoxie, Faithfull & Hopgood

[57] ABSTRACT

A novel, highly nutritious, protein-rich, solid food product comprises fermented and autolyzed proteinaceous material, usually meat, fish or other animal tissue, bound into coherent pieces by a gelled or coagulated binder and stabilized against microbiological activity by an acid pH value, preferably below 5.5. The starting material is comminuted, an acid-producing fermentation culture, for example of Lactobacillus species, is added with fermentable carbohydrate, and the mixture incubated until the pH value has fallen to 4 or below. A coagulable or gellable binder, such as gluten or xanthan gum, is then incorporated, preferably also with antimycotic, and the product shaped, for example by extrusion, and cooked.

4 Claims, No Drawings

PET FOOD AND METHOD OF MAKING SAME

The present invention relates to a proteinaceous food product and its preparation.

The food product according to this invention comprises fermented and autolysed proteinaceous material, bonded into coherent pieces by a gelled or coagulated binder, and stabilized against further microbiological activity by an acid pH value, preferably below 5.5. The product may also contain carbohydrate, humectant and antimycotic, and optionally fat. The humectant together with other water soluble materials may reduce the water activity of the product, so contributing to the stability of the product achieved in the main by the acid pH. The food may also contain such additives as colouring, vitamins, minerals, other supplements and antioxidants. In accordance with one particular aspect of the invention the product also contains viable acid-producing micro-organisms beneficial to the consumer, especially lactobacilli. The food product of this invention is a novel, highly nutritious protein-rich food of solid chewy texture and is of especial value in the feeding of domestic animals.

The food products according to the invention will usually have a pH value in the range 4.0 - 5.5, preferably 4.3, and a water activity (Aw) of 0.85 - 1.00, preferably 0.90. Typical compositions contain by weight: 25 - 60%, preferably about 45%, fermented and autolysed protein material; 3 - 25%, preferably about 18%, binder; 15 - 55%, preferably about 30%, carbohydrate; 2 - 10%, preferably about 5%, humectant; 0.1 - 0.6%, preferably 0.4%, antimycotic, all by weight of the formulation.

The invention also provides a method of making a proteinaceous food product which comprises subjecting proteinaceous material to fermentation and autolysis until an acid pH is developed, incorporating a gellable or coagulable binder with the fermented and autolysed material, and causing the binder to gel or coagulate to form a coherent product, the acid produced during fermentation and autolysis being sufficient to confer microbiological stability on the final product. Carbohydrate, humectant and antimycotic may also be incorporated, and also possibly fat, usually after the fermentation and autolysis stage.

Gelling or coagulation of the binder will usually be brought about by heat, for example by cooking in an oven. Before being cooked the formulation will contain viable micro-organisms of the selected strains employed but their numbers are greatly reduced by cooking. Nevertheless, the presence of residual viable acid-producing micro-organisms, especially lactobacilli, in the finished product may be of potential therapeutic value to, for example, domestic animals by assisting in maintenance of the balanced gut flora necessary to a healthy individual.

The proteinaceous starting material is preferably animal tissue protein, for example, meat, meat offals, fish or fish offals, and should be suitably comminuted for fermentation. Mixtures of starting materials may be employed and can be selected to assist autolysis or to increase acceptance of the product by animals. The starting materials may be pasteurized, sterilized or raw.

The composition may contain carbohydrate as an optional but preferred ingredient. Carbohydrate may be included to modify the texture of the product and for this purpose will usually be of a starchy nature. Cereal flour is preferred but pre-gelatinized starches can also be used. A certain amount of carbohydrate in the final product, more especially up to 4%, may be derived from excess fermentable carbohydrate added to assist the fermentation procedure. Such carbohydrates are usually mono- or di-saccharides, e.g. glucose, galactose, fructose, lactose, sucrose or mixtures thereof.

The terms fermentation and autolysis are used and distinguished from one another in the conventional way. Fermentation is the breakdown of the substrate material by bacteria, in general added for the purpose. Autolysis is the breakdown of proteins by enzymes present in the protein source.

Fermentation is conducted in known manner with selected acid-producing micro-organisms, and must produce sufficient acid to cope with the buffering capacity of subsequently added ingredients and yield a sufficiently low pH in the final product to ensure its microbiological stability. More than one micro-organism may be used during the process, either singly or in combinations. The degree of autolysis allowed is variable and dependent upon the starting materials used. On completion of the fermentation the proteinaceous material is usually in a semi-liquid condition until formed into a coherent material by gelling or coagulation of the added binder. Autolysis of the proteinaceous material appears to have a beneficial effect on flavour development. Where there is insufficient autolytic activity inherent in the raw material, suitable proteolytic and lipolytic enzymes can be added and the term "autolysis" should be construed broadly enough to include such a procedure.

The preferred binder comprises a heat-coagulable protein such as vital (i.e. undenatured) gluten, but carbohydrate materials included in the formulation, especially starchy materials, may exert a binding function. Other binders, notably gellable hydrophilic colloids, such as xanthan gum, may be used. Added starchy material may be, for example, a cereal flour.

The binders should be used in amounts which give the desired degree of chewy coherence to the product, depending on the consistency of the fermented and autolysed material and on the amount of starchy carbohydrate, if any, present. Amounts of up to 25% vital wheat gluten may be used or, alternatively up to 3% xanthan gum. Mixtures of binders may be used, and a preferred binder system is 17.5% vital wheat gluten and 1.2% xanthan gum, based on the total weight of the food product.

A humectant is preferably added to ensure that the moist and succulent texture of the product is maintained during storage. Examples of suitable humectants are glycerol and sorbitol but the preferred humectant is propylene glycol.

An antimycotic is also preferably added to prevent unwanted mould growth. The preferred antimycotic agents are sorbic acid compounds such as sorbates and especially potassium sorbate. Other examples of suitable antimycotics are the propionates. The stage in the process at which the antimycotic is best added will depend on the micro-organism employed for fermentation.

The preferred processing technique is to comminute the starting material by mincing. Other suitable methods of comminution, e.g. chopping, cubing, may be used. The starting materials may be either frozen, chilled or fresh, their condition usually being defined by the method of comminution being used. Moreover, the materials may be sterilized or pasteurized before fermentation.

After comminution the ingredients required by the selected bacteria to ensure a successful fermentation are added. These usually include a fermentable carbohydrate and an organic acid. The antimycotic can be added at this stage if it will not interfere with the fermentation. In a typical example, 10% by weight of starting material of a fermentable carbohydrate, 0.5% of potassium sorbate and 0.2% of citric acid, as an antioxidant, may be added. The choice of carbohydrate will depend upon the fermentation capabilities of the microorganisms being used but are usually mono- or disaccharides, e.g. glucose, galactose, lactose or sucrose. It is generally preferred to use commercial grades of glucose which may be obtained as syrups or powders from various sources. These ingredients are mixed together well with the starting material and the viable inoculum of bacteria added. Among the organisms of choice are *Lactobacillus casei, Lactobacillus lactis, Lactobacillus jugurti, Lactobacillus fermenti, Lactobacillus plantarum, Lactobacillus delbrueckii, Pediococcus acidilactici, Pediococcus cerevisiae, Leuconostoc mysenteroides, Streptococcus lactis, Streptococcus cremoris, Streptococcus thermophilus* or any suitable mutants of these species. Combinations of various species of bacteria may be used as inocula, e.g. *Lactobacillus casei* and *Streptococcus lactis*. When grown as a broth culture the inoculum is added at 10% by volume of the starting material. Concentrated frozen starter cultures may also be used.

More generally the materials added for fermentation may include the following ranges by weight of the protein starting material:

Fermentable carbohydrate — 2 - 12%
Potassium sorbate — 0.1 - 1.0%
Citric acid — 0.1 - 0.5%
Inoculum — 0.1 - 20%

The inoculum is mixed well in and the complete mixture incubated, for example at 30° C, until the pH has fallen to about 4.0 or below. It may be desirable to vary the temperature of incubation depending upon the species of organism being used.

The now semi-liquid fermented material is mixed with the humectant and colouring matter, and thereafter a solid mixture of the binder material and an antioxidant is slowly added and incorporated until a tough cohesive dough having a fibrous texture is produced. This dough is then extruded under low pressure to form a long extrudate which is cooked, cooled, cut into chunks of the desired size and packaged. Alternatively, simultaneous shaping and cooking in an extruder-cooker can be carried out.

The following are examples of the practice of the invention.

EXAMPLE 1

Whole deep frozen sprats were coarsely chopped before being passed through a 5 mm. plate. The comminuted fish were below 0° C. 92.8 Parts by weight of the raw fish were mixed in a bowl mixer with 6.5 parts by weight of glucose, 0.56 parts of potassium sorbate and 0.2 parts of citric acid. 250 Ml. of a 24 LH old suspension of *Lactobacillus casei* in MRS broth were added per 600 g. of fish and the mixing continued until a homogeneous dispersion of organisms was obtained. The whole mix was then transferred to a glass fermentation vessel and incubated at 30° C. After 30 hr. the pH had dropped to 4.0.

49.4 Parts by weight of the fermented sprats were placed in a bowl mixer. A slurry of 0.009 parts of Red 2GS dye and 0.018 parts of Chocolate brown dye in 5.7 parts of propylene glycol was added and mixed well in.

29.6 Parts by weight of English Baker's Flour, 15.3 parts of vital wheat gluten and 0.009 parts of butyl hydroxyanisole (B.H.A.) were blended and added to the other components with mixing. A tough, cohesive dough was produced which was extruded under low pressure through a mincer modified by removal of the cutting blades and the inclusion of a plate containing three holes of circular cross section and 1 cm. diameter. The "worms" obtained were cut into 30 cm. lengths and cooked in an electric oven for 6 minutes at 275° F. On cooling, the "worms" were cut into pieces approximately 1 cm. long and packaged under nitrogen in 'Saran' laminated packs.

The product was in the form of a coherent fibrous chunk with a moist and succulent texture. It was highly acceptable to domestic pets, had a pH of 4.30, a moisture content of 33.8% and a water activity (Aw) of 0.91.

EXAMPLE 2

Raw deep frozen ox heart was comminuted by passage first through a 1 cm. plate and then again through a 0.5 cm. plate fitted to a mincer. Heart, glucose, potassium sorbate and citric acid were then mixed, inoculated and incubated as described in Example 1.

42.0 Parts of fermented heart pH 3.9 were placed in a bowl mixer. A slurry of 0.008 parts by weight of Red 2GS dye and 0.015 parts of Chocolate brown dye in 4.9 parts of propylene glycol were added and mixed in well.

25.40 Parts by weight of English Baker's flour, 13.1 parts of vital wheat gluten and 0.008 parts of B.H.A. were blended and added to the orginal mixture slowly and with stirring. 14.2 Parts of water were added and the ingredients worked until a tough, extensible dough had formed. Small lumps of tissue were noticeable within the dough.

The mix was extruded and cooked as described in Example 1.

The product was in the form of a succulent meatlike chunk with excellent surface texture and high acceptability to domestic animals. The pH was 4.35, Aw 0.941 and the moisture content 42.1%.

EXAMPLE 3

The following is an example of an extruder-cooking procedure.

1,000 Parts by weight of raw deep frozen sprats were comminuted by mincing through a 1.0 cm. plate. 100 Parts by weight of fermentable carbohydrate ('Trudex'), 6 parts by weight of potassium sorbate and 2 parts by weight of citric acid were added to the fish and mixed in well. 110 Parts by weight of a 24 log hour old suspension of *Lactobacillus casei* in broth was added and mixed in well.

The whole mixture was incubated at 30° C for 15 - 20 hours during which time the pH fell to 3.9 and autolysis took place to produce a slurry of a fluid consistency. The low pH slurry was used in the following formulation:

Fermented sprats 33.95 parts by weight
English baker's flour 36.50 parts by weight
Vital gluten 20.80 parts by weight
Propylene glycol 6.00 parts by weight
Salt 1.50 parts by weight B.H.A. 0.0075 parts by weight
Vitamin supplement 0.396 parts by weight
Colouring 0.574 parts by weight
Choline chloride 0.536 parts by weight
Potassium sorbate 0.187 parts by weight The above ingredients were mixed together in a mixer fitted with a dough hook. On development, the dough was transferred to a steam-heated extruder and extruded under low pressure through a die of rectangular cross section. The temperature was about 120° C. The resultant sausage was force-cooled in a current of cool air before being chopped into pieces of the desired size and packaged under air in transparent laminated pouches.

The product had a firm, moist resilient texture and a shiny translucent surface. The pH was 4.4, the Aw 0.85 and the moisture content 30.9%.

EXAMPLE 4

This example illustrates how the vital gluten component of the formulation may be replaced by a hydrophilic colloid such as Xanthan gum.

Sprats were fermented as described in Example 3. The low pH slurry was used in the following formulation:

Fermented Sprats 44.75 parts by weight
English baker's flour 46.43 parts by weight
B.H.A. 0.008 part by weight
Red 2GS 0.016 parts by weight
Chocolate Brown 0.008 parts by weight
Salt 1.12 parts by weight
Propylene glycol 5.26 parts by weight
Xanthan 2.40 parts by weight The ingredients were mixed together in a mixer fitted with a dough hook. The resultant dough was extruded under low pressure through a mincer modified by removal of the cutting blades and fitted with a plate containing two holes each of 0.7 cm. diameter. The sausage so formed was cut into 30 cm. lengths and cooked at 140° C. for 8 minutes in an electric oven fitted with an air circulating fan. On removal from the oven the product developed a desirable crinkled surface texture. The sausages were allowed to cool before being chopped into smaller pieces and packaged as described previously.

The product had a moist succulent and firm texture with a pH of 4.3 and an Aw of 0.89.

EXAMPLE 5

This example illustrates the use of a different selection of meats in the fermentation.

250 Parts by weight each of liver, beef lung, tripe and heart were comminuted by passage through a mincer fitted with a 1.0 cm. plate. 100 Parts by weight of spray-dried glucose syrup, 6 parts by weight of potassium sorbate, 2 parts by weight of citric acid were added and the ingredients mixed well together. 55 Parts by weight of a 24 log hour broth culture of *Streptococcus lactis* and 55 parts by weight of a 24 log hour broth culture of *Lactobacillus casei* were added and mixed in well. The whole mixture was incubated at 30° C. until the pH dropped to 4.0. During this time autolysis took place and a thick viscous slurry was produced. The low pH slurry was used in the following formulation:

Fermented meats 32.34 parts by weight
English baker's flour 36.96 parts by weight
Vital gluten 8.70 parts by weight
B.H.A. 0.008 parts by weight
Red 2GS 0.016 parts by weight
Chocolate Brown 0.008 parts by weight
Salt 1.08 parts by weight
Propylene glycol 5.31 parts by weight
$H_2O$ 13.86 parts by weight
Xanthan 1.2 parts by weight The ingredients were mixed and cooked as described in Example 4.

The product had a pH of 4.4 and an Aw of 0.88. The texture was firm and succulent with a very desirable surface wrinkle induced by the Xanthan gum. The product was highly acceptable to pet animals.

We claim:

1. A method of making a proteinaceous food product comprising the steps of: subjecting proteinaceous material in the presence of added fermentable carbohydrate to acid-producing fermentation and autolysis until said material is semi-liquid and has an acid pH; incorporating 3 to 25% of a gellable or coagulable binder selected from the group consisting of heatcoagulable protein, starch and hydrophillic gums and mixtures thereof with the fermented and autolysed material; adding humectant in the quantity of from 2 to 10% by weight of the total mix; shaping the mix; and heating said mixture thereby causing the binder to gel or coagulate to form a coherent chewy solid shaped product; the acidity and moisture content of said fermented and autolysed material being such that the final product has a pH value of 4.0–5.5 and water activity between 0.85 and 1.00.

2. A method according to claim 1 wherein the binder comprises heat-coagulable gluten and the material with the binder incorporated is cooked to form the coherent product.

3. A method according to claim 1 wherein said mix is simultaneously shaped and heated to ensure retention of such shape.

4. A method of making a proteinaceous food product comprising:
   providing protein material comprising animal tissue protein in raw, pasteurized or sterilized form;
   subjecting said animal tissue protein containing added fermentable carbohydrate to acid-producing fermentation and autolysis until a semi-liquid slurry having a pH value not exceeding 4 is produced;
   incorporating with said fermented and autolysed slurry 3 to 25% an edible gel binder and from 2 to 10% humectant by weight of the total mix;
   shaping the resulting mix;
   and heating the mix and causing the binder to gel or coagulate and form a shape-retaining microbiologically stable product having a pH in the range 4.0 to 5.0 and a water activity in the range 0.85–1.00.

* * * * *

UNITED STATES PATENT AND TRADEMARK OFFICE
CERTIFICATE OF CORRECTION

PATENT NO. : 4,041,181

DATED : August 9, 1977

INVENTOR(S) : Ian Edward Burrows et al.

It is certified that error appears in the above-identified patent and that said Letters Patent are hereby corrected as shown below:

Column 6, line 54, after "25%" insert --of--.

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

PATENT NO. : 4,041,181
DATED : August 9, 1977
INVENTOR(S) : Ian Edward Burrows et al.

It is certified that error appears in the above—identified patent and that said Letters Patent are hereby corrected as shown below:

Change the designation of the assignee appearing on the first page by deleting "Pedigree Petfoods Limited, Melton Mowbray, England" and substituting the name of the assignee designated as follows:

Assignee: Mars Limited,
                  London, England

Signed and Sealed this

Tenth Day of July 1979

[SEAL]

Attest:

LUTRELLE F. PARKER
        Attesting Officer     Acting Commissioner of Patents and Trademarks